(12) United States Patent
McDaniel et al.

(10) Patent No.: US 6,934,033 B2
(45) Date of Patent: Aug. 23, 2005

(54) SINGLE-ETALON, MULTI-POINT WAVELENGTH CALIBRATION REFERENCE

(75) Inventors: Donald L. McDaniel, North Andover, MA (US); Rong Huang, Woburn, MA (US); Parviz Tayebati, Boston, MA (US); Reich L. Watterson, Lexington, MA (US)

(73) Assignee: Coretek, Inc., Billerica, MA (US)

( * ) Notice: Subject to any disclaimer, the term of this patent is extended or adjusted under 35 U.S.C. 154(b) by 270 days.

(21) Appl. No.: 09/750,204

(22) Filed: Dec. 28, 2000

(65) Prior Publication Data

US 2004/0070768 A1 Apr. 15, 2004

(51) Int. Cl.⁷ .............................................. G01B 9/02
(52) U.S. Cl. ...................................................... 356/454
(58) Field of Search ............................... 356/454, 519; 372/32

(56) References Cited

U.S. PATENT DOCUMENTS 5,373,515 A * 12/1994 Wakabayashi et al. ........ 372/20
5,838,437 A * 11/1998 Miller et al. ................. 356/478

* cited by examiner

Primary Examiner—Gregory J. Toatley, Jr.
Assistant Examiner—Michael A. Lyons
(74) Attorney, Agent, or Firm—Steubing McGuinness & Manaras LLP

(57) ABSTRACT

Wavelength reference apparatus for use in calibrating a tunable Fabry-Perot filter or a tunable VCSEL, whereby the device may be tuned to a precise, known wavelength, the wavelength reference apparatus comprising an LED, where the LED is chosen so as to have an emission profile which varies with wavelength; an etalon, where the etalon is chosen so as to have a transmission profile which comprises a comb of transmission peaks, with each transmission peak occurring at a precise, known wavelength; and a detector for detecting the light emitted by the LED and passing through the etalon; whereby when a tunable Fabry-Perot filter or tunable VCSEL is positioned between the etalon and the detector, and the device is swept through its tuning range by varying the tuning voltage applied to the device, the known transmission wavelengths established by the LED and the etalon can be correlated to counterpart tuning voltages of the device, whereby to calibrate the device.

12 Claims, 7 Drawing Sheets

| WAVELENGTH ($\lambda$) | TUNING VOLTAGE (V) |
|---|---|
| $\lambda_1$ | $V_1$ |
| $\lambda_2$ | $V_2$ |
| $\lambda_3$ | $V_3$ |
| $\lambda_4$ | $V_4$ |
| $\lambda_5$ | $V_5$ |
| $\lambda_6$ | $V_6$ |
| $\lambda_7$ | $V_7$ |
| $\lambda_8$ | $V_8$ |
| $\lambda_9$ | $V_9$ |

FIG. 7

SINGLE-ETALON, MULTI-POINT WAVELENGTH CALIBRATION REFERENCE

FIELD OF THE INVENTION

This invention relates to photonic devices in general, and more particularly to tunable filters and tunable lasers and filter based optical spectrum analyzers.

BACKGROUND OF THE INVENTION

Tunable Fabry-Perot filters and tunable vertical cavity surface emitting lasers (VCSEL's) have recently generated considerable interest in the art. This is because these devices are believed to have application for a wide range of different optical components and systems, e.g., wavelength division multiplexing (WDM) fiberoptic systems, switches, routers, highly compact spectroscopic interferometers, optical transceivers, etc.

In some tunable Fabry-Perot filters and in some tunable VCSEL's, tuning is achieved by using an electrostatic field to move a top mirror relative to a bottom mirror, whereby to change the length of the Fabry-Perot cavity and hence tune the wavelength of the device.

While such a construction is advantageous in that it provides a fast and easy way to tune the device, in practice it has proven difficult to produce relatively uniform devices. Significant performance variations typically occur from device-to-device and from batch-to-batch.

SUMMARY OF THE INVENTION

As a result, one object of the present invention is to provide a novel wavelength reference apparatus for use in calibrating a tunable Fabry-Perot filter and/or a tunable VSCEL, whereby the device may be tuned to a precise, known wavelength.

Another object of the present invention is to provide a novel method for calibrating a tunable Fabry-Perot filter and/or a tunable VSCEL, whereby the device may be tuned to a precise, known wavelength.

These and other objects are addressed by the present invention.

In one form of the invention, there is provided a wavelength reference apparatus for use in calibrating a tunable Fabry-Perot filter or a tunable VCSEL, whereby the device may be tuned to a precise, known wavelength, the wavelength reference apparatus comprising an LED, where the LED is chosen so as to have an emission profile which varies with wavelength; an etalon, where the etalon is chosen so as to have a transmission profile which comprises a comb of transmission peaks, with each transmission peak occurring at a precise, known wavelength; and a detector for detecting the light emitted by the LED and passing through the etalon; whereby when a tunable Fabry-Perot filter or tunable VCSEL is positioned between the etalon and the detector, and the device is swept through its tuning range by varying the tuning voltage applied to the device, the known transmission wavelengths established by the LED and the etalon can be correlated to counterpart tuning voltages of the device, whereby to calibrate the device.

In another form of the invention, there is provided a novel method for calibrating a tunable Fabry-Perot filter or a tunable VCSEL, whereby the device may be tuned to a precise, known wavelength, comprising the steps of: (1) energizing an LED so as to produce an emission of light, the LED being chosen so as to have an emission profile which varies with wavelength; (2) passing the light output by the LED through an etalon so as to generate a comb of known transmission peaks, with each transmission peak occurring at a precise, known wavelength; (3) passing light from the etalon to the device; and (4) sweeping the device through its tuning range by varying the tuning voltage applied to the device, whereby a correlation may be established between the known wavelength of each transmission peak and the tuning voltage associated with that wavelength, whereby to calibrate the device.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIG. 7 is a lookup table illustrating the correlation between the tuning voltage, and the transmission wavelength, for a tunable Fabry-Perot filter and/or a tunable VESEL, whereby the device may be tuned to a precise, known wavelength.

DETAILED DESCRIPTION OF THE PREFERRED EMBODIMENTS

In pending prior U.S. patent application Ser. No. 09/105, 399, filed Jun. 26, 1998 by Parviz Tayebati et al. for MICROELECTROMECHANICALLY TUNABLE, CONFOCAL, VERTICAL CAVITY SURFACE EMITTING LASER AND FABRY-PEROT FILTER, and in pending prior U.S. patent application Ser. No. 09/543,318, filed Apr. 5, 2000 by Peidong Wang et al. for SINGLE MODE OPERATION OF MICROELECTROMECHANICALLY TUNABLE, HALF-SYMMETRIC, VERTICAL CAVITY SURFACE EMITTING LASERS, both of which patent applications are hereby incorporated herein by reference, there are disclosed tunable Fabry-Perot filters and tunable vertical cavity surface emitting lasers (VCSEL's).

Figure 1:
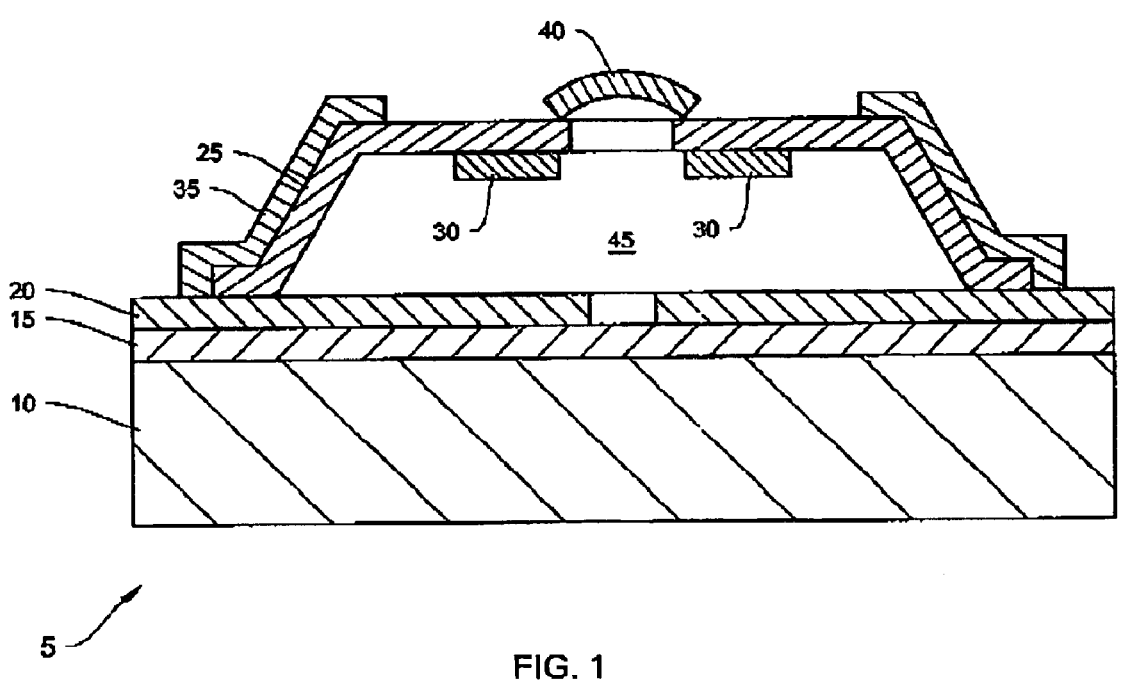
FIG. 1 is a schematic side sectional view of a tunable Fabry-Perot filter.

Looking now at FIG. 1, there is shown a tunable Fabry-Perot filter 5. Filter 5 generally comprises a substrate 10, a bottom mirror 15 mounted to the top of substrate 10, a bottom electrode 20 mounted to the top of bottom mirror 15, a thin membrane support 25 atop bottom electrode 20, a top electrode 30 fixed to the underside of thin membrane support 25, a reinforcer 35 fixed to the outside perimeter of thin membrane support 25, and a confocal top mirror 40 set atop thin membrane support 25, with an air cavity 45 being formed between bottom mirror 15 and top mirror 40.

As a result of this construction, a Fabry-Perot filter is effectively created between top mirror 40 and bottom mirror 15. Furthermore, by applying an appropriate voltage across top electrode 30 and bottom electrode 20, the position of top mirror 40 can be changed relative to bottom mirror 15, whereby to change the length of the Fabry-Perot cavity, and hence tune Fabry-Perot filter 5.

Figure 2:
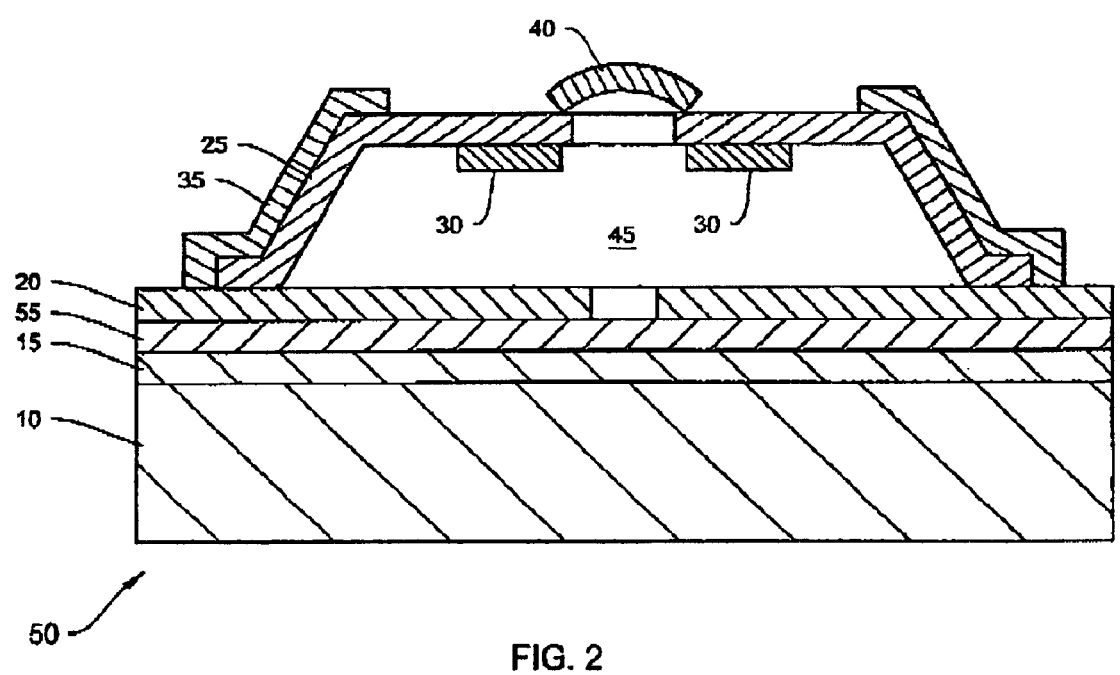
FIG. 2 is a schematic side sectional view of a tunable VCSEL.

Correspondingly, and looking next at FIG. 2, a tunable vertical cavity surface emitting laser (VCSEL) 50 can be constructed by positioning a gain region (or "active region") 55 between bottom mirror 15 and bottom electrode 20. As a result, when gain region 55 is appropriately stimulated, e.g., by optical pumping, lasing can be established within air cavity 45, between top mirror 40 and bottom mirror 15. Furthermore, by applying an appropriate voltage across top electrode 30 and bottom electrode 20, the position of top mirror 40 can be changed relative to bottom mirror 15, whereby to change the length of the laser's resonant cavity, and hence tune VCSEL 50.

As noted above, tunable Fabry-Perot filters and tunable VCSEL's of the type disclosed above are advantageous, since they can be quickly and easily tuned by simply changing the voltage applied across the top electrode and the bottom electrode.

However, it has been found that tunable Fabry-Perot filters and tunable VCSEL's of the type disclosed above have performance characteristics which can vary slightly from unit to unit. In addition, it has also been found that the performance characteristics of any given unit can vary slightly in accordance with its age, temperature, etc. Accordingly, it is generally not possible to precisely predict in advance the exact voltage which must be applied to a particular device in order to tune that device to a specific wavelength. This can present an issue in some applications, particularly telecommunications applications, where the devices may need to be tuned to precise, known wavelengths (e.g., the ITU WDM grid).

Figure 3:
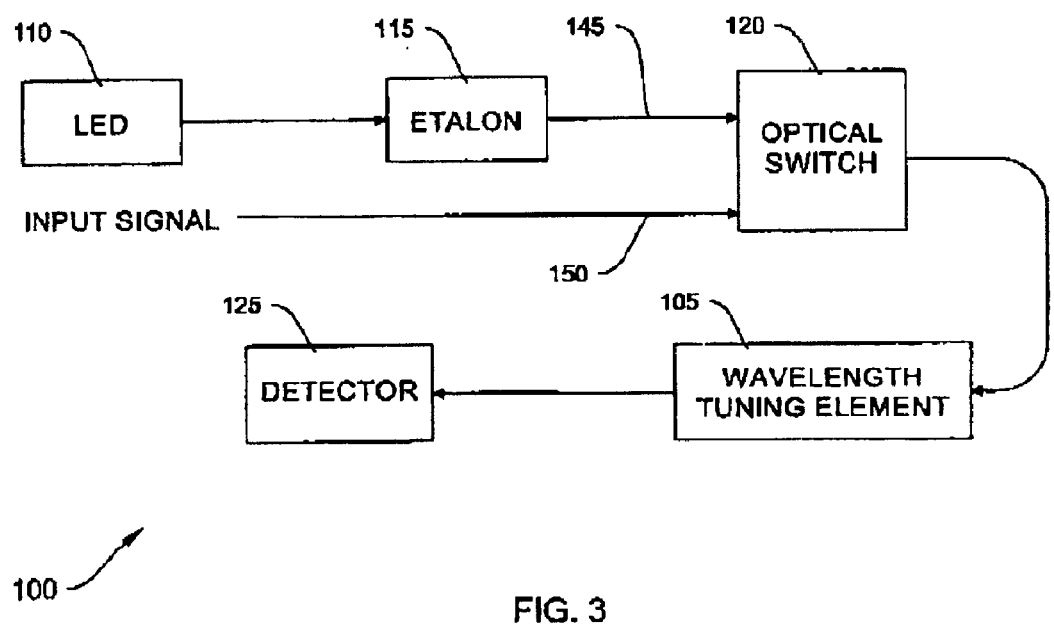
FIG. 3 is a schematic diagram of a novel wavelength reference apparatus for use in calibrating a tunable Fabry-Perot filter and/or a tunable VCSEL, whereby the device may be tuned to a precise, known wavelength.

Looking next at FIG. 3, there is shown a system 100 which comprises a wavelength reference apparatus for use in calibrating a tunable Fabry-Perot filter and/or a tunable VCSEL, whereby the device may be tuned to a precise, known wavelength.

More particularly, system 100 generally comprises a tunable Fabry-Perot filter or tunable VCSEL 105, a light emitting diode (LED) 110, an etalon 115, an optical switch 120, and a detector 125.

The tunable Fabry-Perot filter or tunable VCSEL 105 is preferably a tunable Fabry-Perot filter or tunable VCSEL of the type disclosed above. For convenience of description, tunable device 105 will hereinafter generally be described in the context of being a tunable Fabry-Perot filter; however, it will be appreciated that the present invention is equally applicable to the situation where tunable device 105 comprises a tunable VCSEL.

Figure 4:
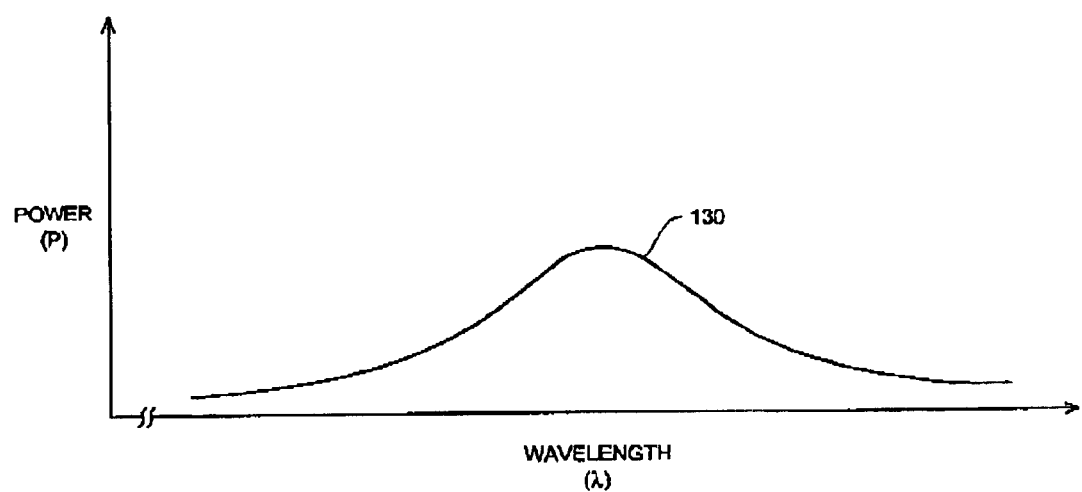
FIG. 4 is a schematic diagram of the emission profile of an LED incorporated into the wavelength reference apparatus shown in FIG. 3.

LED 110 comprises an LED which has an emission profile 130 of the sort shown in FIG. 4, i.e., a power output which varies with wavelength. It will be appreciated that emission profile 130 is an inherent characteristic of the specific LED chosen for incorporation in the system, and thus is known to the system. By way of example but not limitation, LED 110 may comprise a broadband InGaAsP/InP LED.

Figure 5:
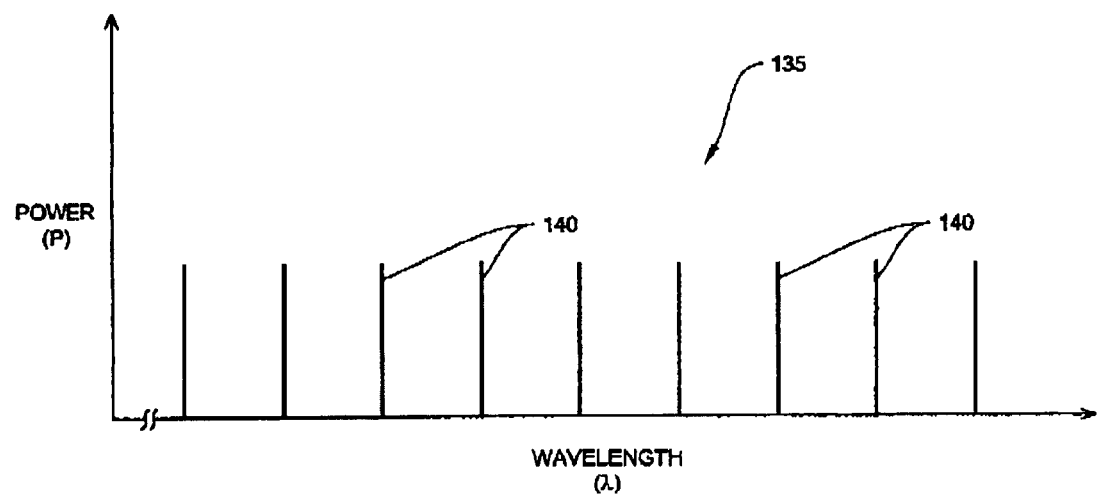
FIG. 5 is a schematic diagram of the transmission profile of an etalon incorporated into the wavelength reference apparatus shown in FIG. 3.

Etalon 115 comprises a Fabry-Perot etalon which has a transmission profile 135 of the sort shown in FIG. 5, i.e., a comb of known transmission peaks 140 spaced across a range of wavelengths. It will be appreciated that the exact locations (i.e., wavelengths) of transmission peaks 140 are an inherent characteristic of the specific etalon chosen for incorporation in the system, and thus are known to the system. Significantly, the specific wavelengths of transmission peaks 140 are a function of the etalon's substrate thickness and refractive index, neither of which varies significantly with time. By way of example but not limitation, etalon 115 may comprise a solid or air-spaced filter, including a MEMs (microelectromechanical) etalon.

Figure 6:
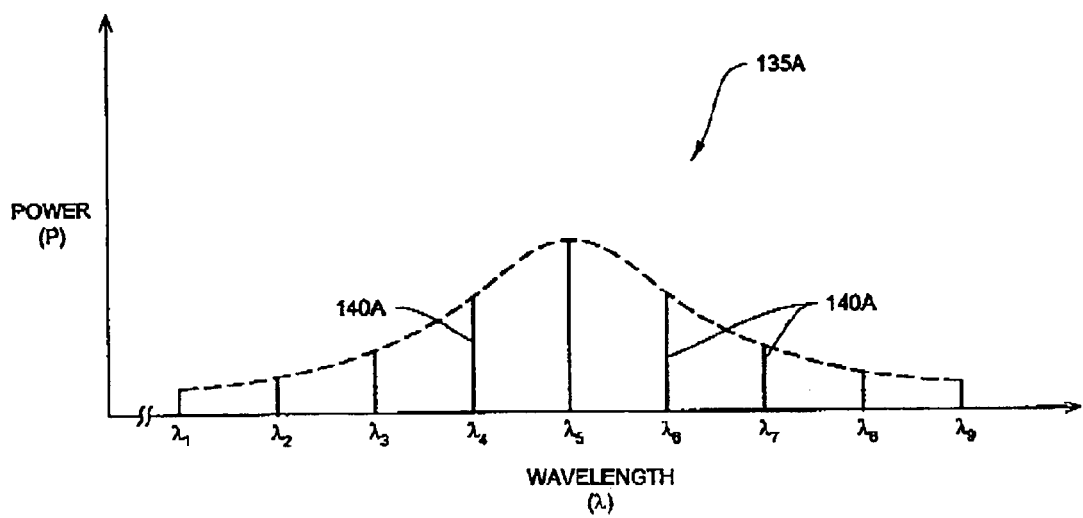
FIG. 6 is a schematic diagram of the composite transmission profile of the LED/etalon combination incorporated into the wavelength reference apparatus shown in FIG. 3.

By placing LED 110 and etalon 115 in series, in the manner shown in FIG. 3, the LED emission profile 130 will be tailored by the transmission profile 135 of etalon 115, whereby to produce a composite transmission profile 135A of the sort shown in FIG. 6, i.e., a comb of known transmission peaks 140A. Significantly, the specific wavelengths $\lambda_1$, $\lambda_2$, $\lambda_3$, etc. of each of the transmission peaks 140A will always be precisely and absolutely known, since the emission characteristics of LED 110, and the transmission characteristics of etalon 115, are known.

In this respect it should be appreciated that LED 110 and etalon 115 are used together, in series, so as to provide a unique and unambiguous transmission profile 135A (FIG. 6), i.e., a unique and unambiguous comb of known transmission peaks 140A. If etalon 115 were to be used alone, its transmission profile 135 (FIG. 5) could result in "order ambiguity", i.e., confusion in differentiating one transmission peak 140 from another transmission peak 140. With the present invention, this ambiguity is resolved by using the spectral distribution of LED 110, which varies with wavelength. In effect, using LED 110 and etalon 115 in series imposes an amplitude envelope on the etalon transmission comb, such that the transmission peaks 140A can be uniquely identified by sweeping the device through a range of wavelengths. Alternatively, other order resolution schemes may also be employed, e.g., adding a reference or band-limiting filter in-line to restrict the number of etalon orders observed, or designing the stop-band of the etalon mirrors in such a way as to limit the etalon orders observed, etc.

Optical switch 120 comprises any optical switch capable of switching between (i) a line 145 receiving the output of etalon 115, and (ii) a line 150 receiving an input signal, e.g., from a wavelength division multiplexing (WDM) optical network system.

Detector 125 comprises any suitable optical detector of the sort well known in the art, e.g., an InGaAs optical detector.

In order to calibrate tunable filter 105, optical switch 120 is set so as to select the input from line 145 (i.e., the input from LED 110 and etalon 115), and LED 110 is energized. This causes light, with the known transmission profile 135A (FIG. 6) to be input to tunable filter 105. Tunable filter 105 is then swept across its tuning range as detector 125 is monitored. This is done by sweeping the tuning voltage applied to the device. When detector 125 detects an output peak, the light passing through tunable filter 105 will be at a wavelength corresponding to a specific transmission peak 140A. By correlating a specific tuning voltage $V_1$, $V_2$, $V_3$, etc. with a specific known transmission peak $\lambda_1$, $\lambda_2$, $\lambda_3$, etc., tunable filter 105 may have its tuning voltage calibrated against the known wavelengths of transmission peaks 140A. A data table such as that shown in FIG. 7 may be constructed to correlate a specific tuning voltage against a specific, known wavelength. This data table may then be used to select the proper tuning voltage for a particular target wavelength.

To the extent that transmission peaks 140A are spaced more widely apart than the desired tuning resolution for tunable filter 105, intermediate values may be interpolated from the information available in the data table. Thus, for example, to the extent that it is desired to tune the device to a wavelength between $\lambda_3$ and $\lambda_4$, an appropriate tuning voltage located between $V_3$ and $V_4$ will be applied to the device. Such interpolation may be effected using both linear, and non-linear, interpolation techniques.

To the extent that the span of transmission peaks 140A (FIG. 6) covers something less than the complete tuning range of tunable filter 105, it may be necessary to extrapolate from the information available in the data table. Such extrapolation may be effected using both linear, and non-linear, extrapolation techniques.

Two preferred non-linear interpolation/extrapolation techniques are polynomial extrapolation and cubic spline fit extrapolation.

Once the system has been used to properly calibrate tunable filter 105, switch 120 may be reset so as to select the input from line 150 (i.e., the input signal from, for example, a WDM optical network system). Thereafter, the calibrated tunable filter 105 may be used to tune that input signal as desired.

If desired, switch 120 may be replaced by an optical coupler and shutter assembly. In this situation, when calibration is to be effected, the shutter is activated so as to block the input from line 150, and then LED 110 is energized. After calibration has been completed, LED 110 is turned off and the shutter reset so that the input from line 150 will be passed to tunable filter 105.

It is to be understand that the present invention is by no means limited to the particular constructions and method steps disclosed above and/or shown in the drawings, but also comprises any modifications or equivalents within the scope of the claims.

What is claimed is:

1. A wavelength reference apparatus for use in calibrating a device comprising a tunable Fabry-Perot filter or a tunable VCSEL, the wavelength reference apparatus being configured to tune the device to a precise, known wavelength, the wavelength reference apparatus comprising;

an LED, the LED having an emission profile which varies with wavelength; an etalon, where the etalon is chosen so as to have a transmission profile which comprises a comb of transmission peaks, with each transmission peak occurring at a precise, known wavelength;

a detector for detecting the light emitted by said LED and passing through said etalon; and the device being positioned between said etalon and said detector, and the device being swept through its tuning range by varying the tuning voltage applied to the device, the known transmission wavelengths established by said LED and said etalon are correlated to counterpart tuning voltages of the device so as to calibrate the device.

2. Apparatus according to claim 1 wherein said LED comprises a broadband InGuAsP/InP LED.

3. Apparatus according to claim 1 wherein said etalon comprises a solid filter.

4. Apparatus according to claim 1 wherein said etalon comprises an air-spaced filter.

5. Apparatus according to claim 1 wherein said etalon comprises a MEMs (microelectromechanical) etalon.

6. A method for calibrating a device comprising a tunable Fabry-Perot filter or a tunable VCSEL, the wavelength reference apparatus being configured to tune the device to a precise, known wavelength, the method comprising the steps of:

(1) energizing an LED so as to produce an emission of light, the LED having an emission profile which varies with wavelength;

(2) passing the light output by the LED through an etalon so as to generate a comb of known transmission peaks, with each transmission peak occurring at a precise, known wavelength;

(3) passing light from the etalon to the device; and (4) sweeping the device through its tuning range by varying the tuning voltage applied to the device so as to correlate the known wavelength of each transmission peak and the tuning voltage associated with that wavelength so as to calibrate the device.

7. A method according to claim 6 wherein said LED comprises a broadband InGaAsP/InP LED.

8. A method according to claim 6 wherein said etalon comprises a solid filter.

9. A method according to claim 6 wherein said etalon comprises an air-spaced filter.

10. A method according to claim 6 wherein said etalon comprises a MEMs (microelectromechanical) etalon.

11. A method according to claim 6 wherein said method includes interpolation to determine values between transmission peaks.

12. A method according to claim 6 wherein said method includes extrapolation to determine values beyond the span of the transmission peaks.

* * * * *